Jan. 5, 1965  F. G. FRANCIS ETAL  3,164,074
ELECTROPHOTOGRAPHIC REPRODUCTION MACHINES
Filed June 22, 1960  15 Sheets—Sheet 1
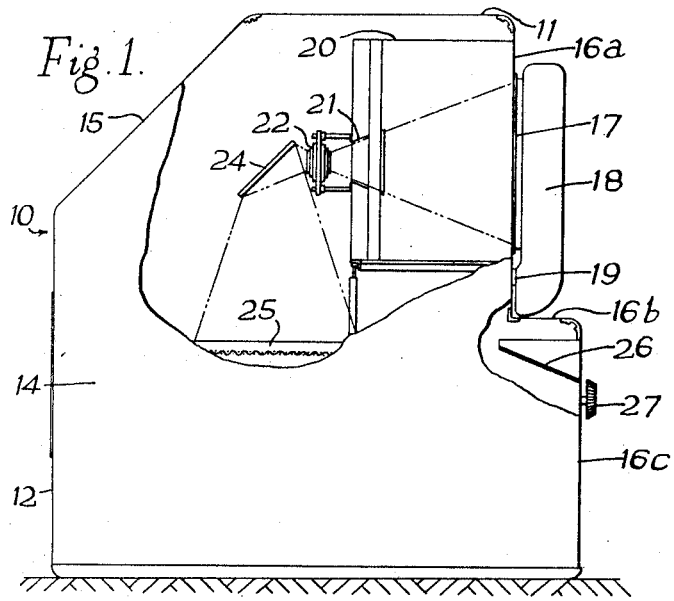
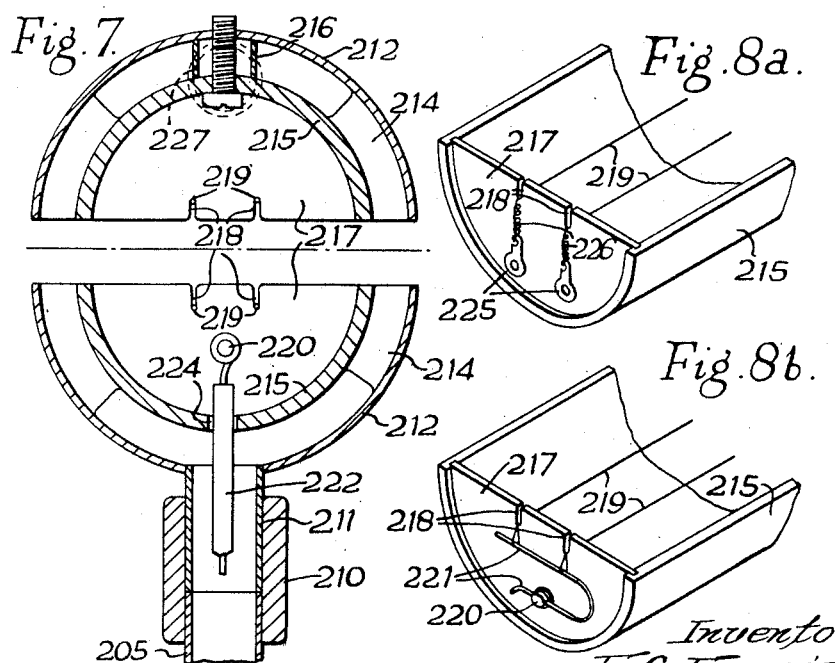
Inventors.
F. G. Francis,
N. C. Huxford,
J. A. Seaward, &,
G. H. Burton.
By Merriam, Smith & Marshall
Attys.

Jan. 5, 1965     F. G. FRANCIS ETAL     3,164,074
ELECTROPHOTOGRAPHIC REPRODUCTION MACHINES
Filed June 22, 1960     15 Sheets-Sheet 2

Inventors
F. G. Francis,
N. C. Huxford,
J. A. Seaward, &
G. H. Burton.
By Merriam, Smith + Marshall
Attys Inventors.
F. G. Francis,
N. C. Huxford,
J. A. Seaward, &
G. H. Burton.
By Merriam, Smith & Marshall
Attys.

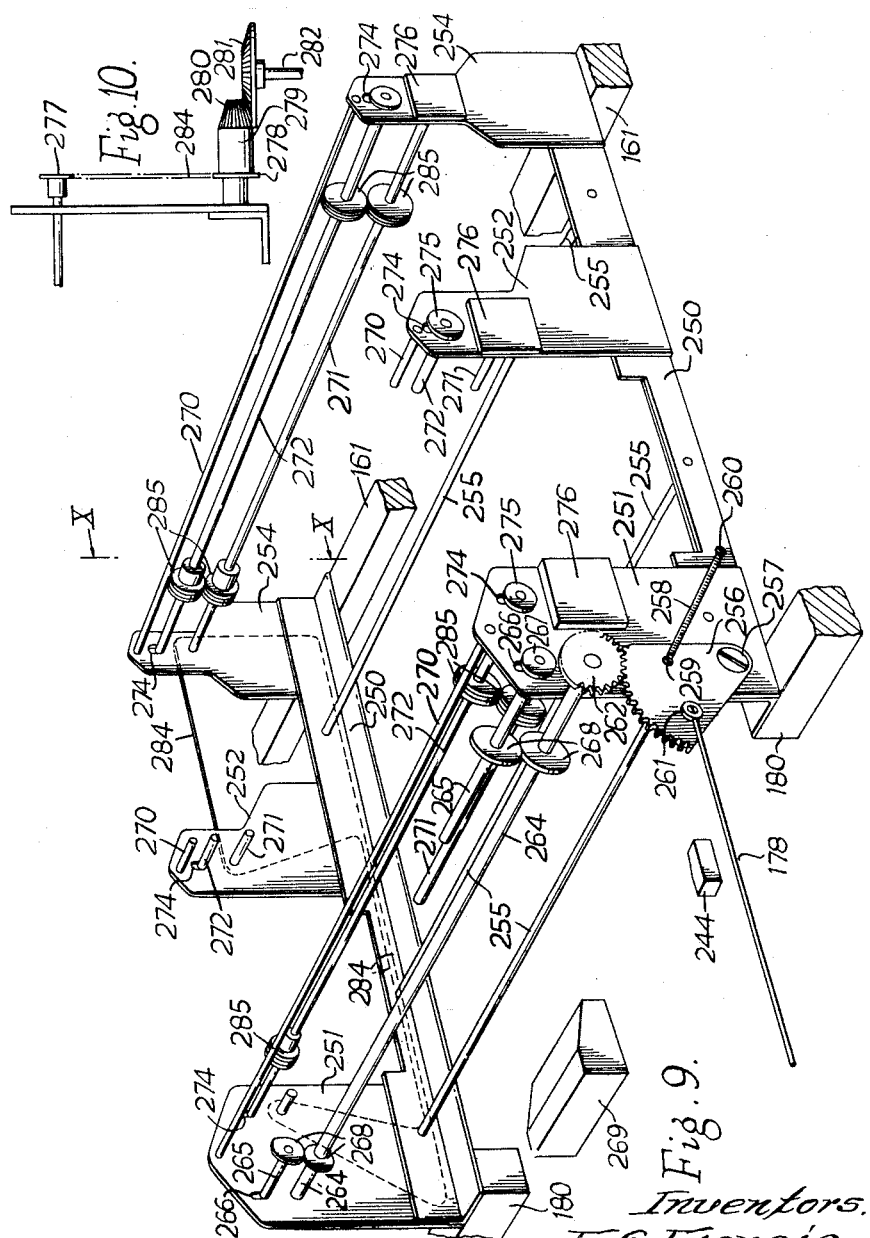

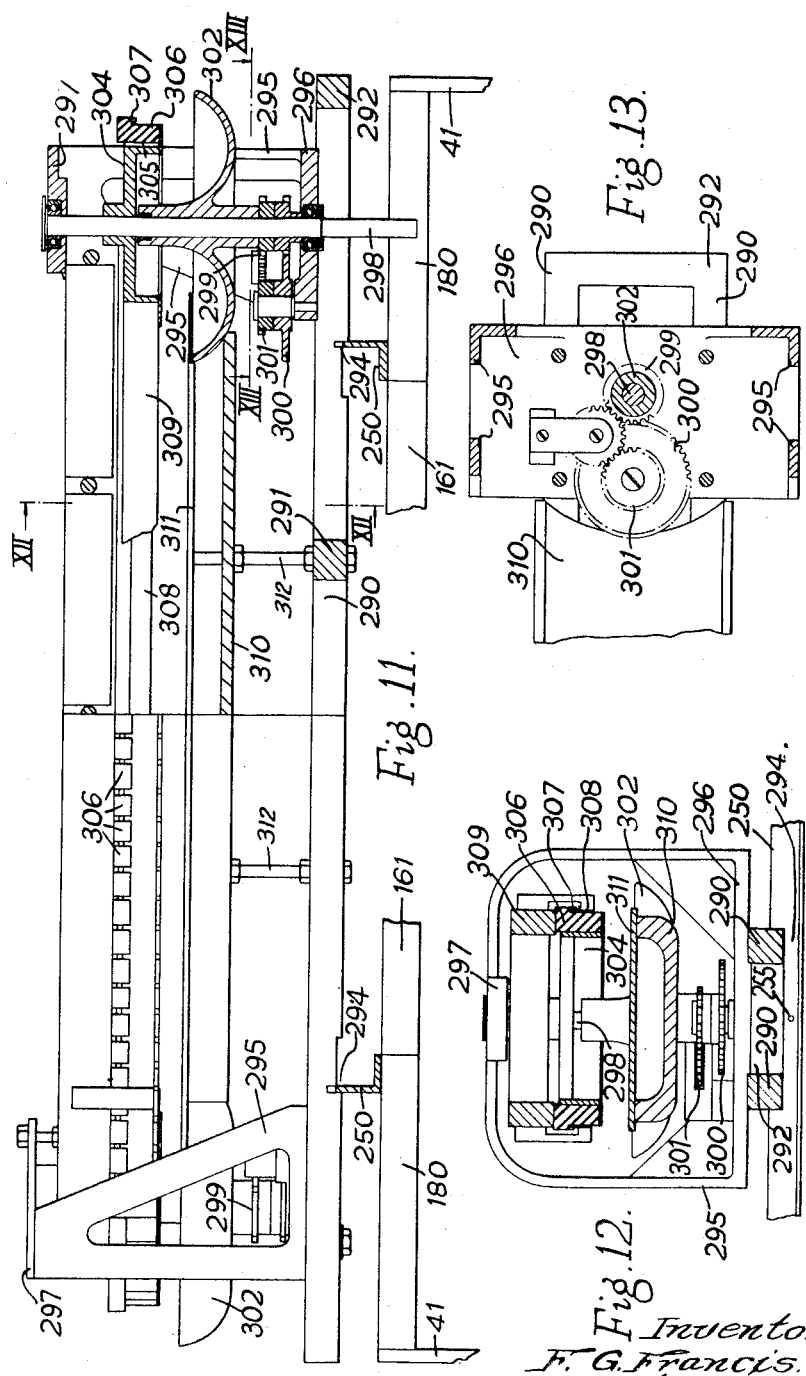

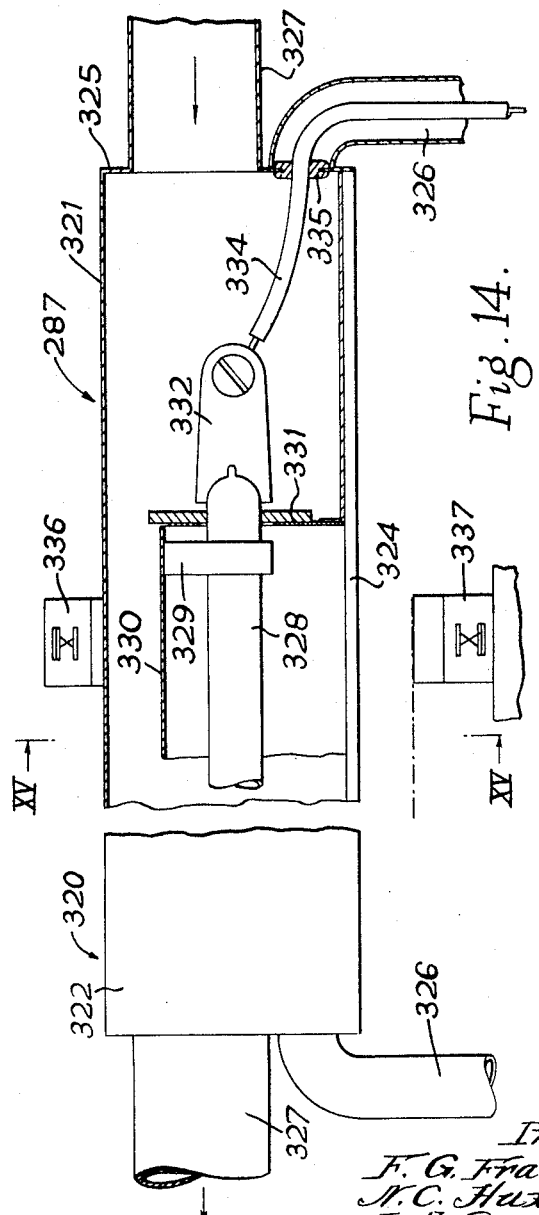

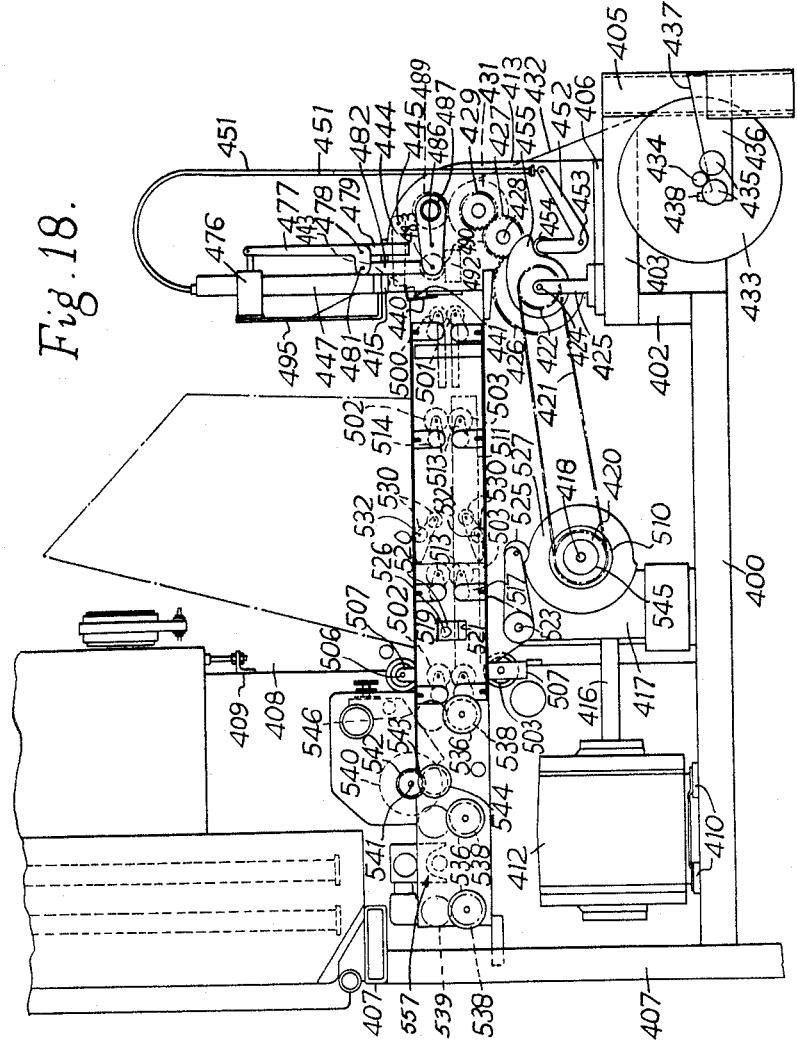

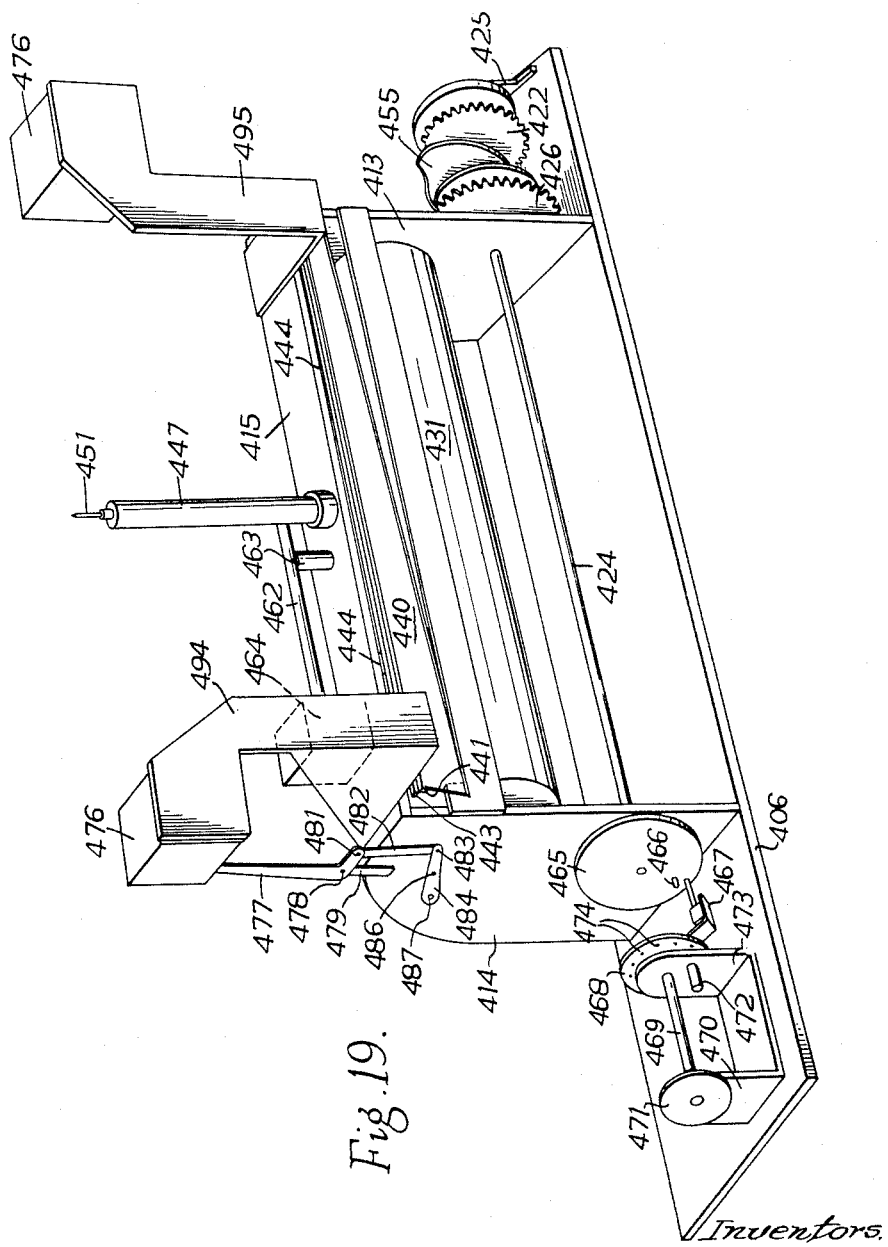

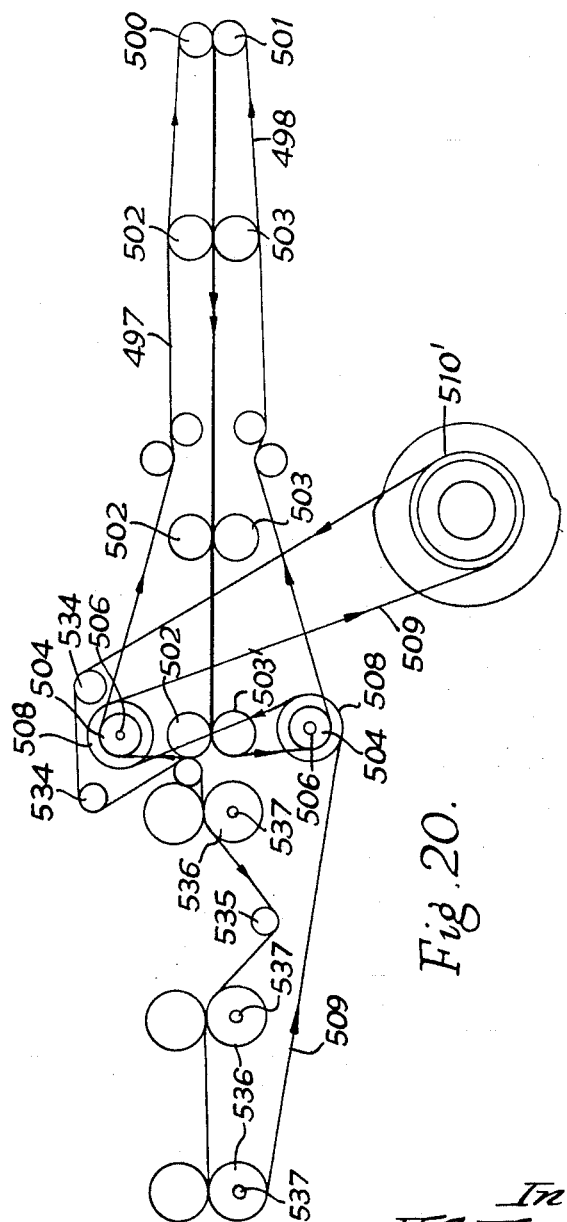

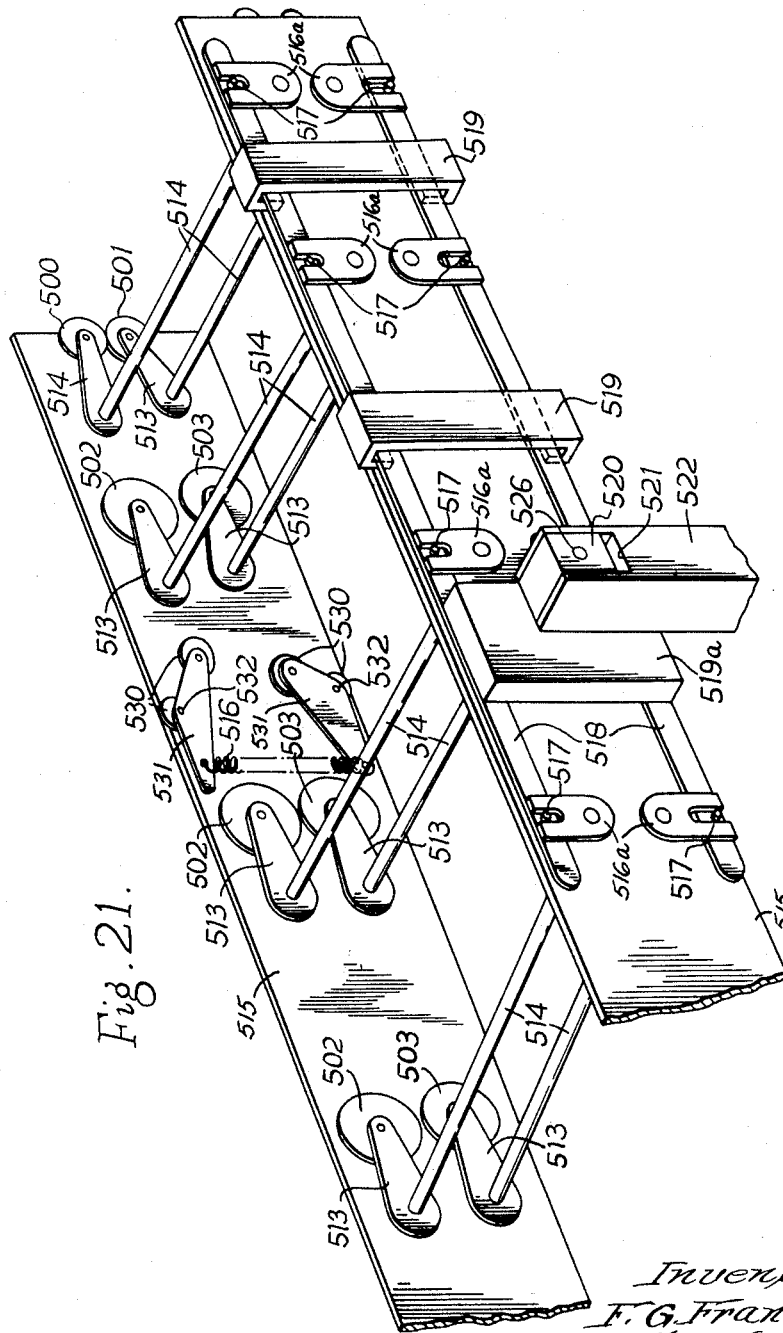

United States Patent Office 3,164,074
Patented Jan. 5, 1965

3,164,074
ELECTROPHOTOGRAPHIC REPRODUCTION MACHINES
Frederick George Francis, London, Norman Charles Huxford and John Albert Seaward, Enfield, and George Herbert Burton, Bridlington, England, assignors to Caribonum Limited, London, England, a company of Great Britain
Filed June 22, 1960, Ser. No. 38,057
Claims priority, application Great Britain June 24, 1959
2 Claims. (Cl. 95—1.7)

The present invention relates to electrophotographic reproduction and is particularly concerned with improvements in machines for carrying out electrophotographic reproduction.

In electrophotographic reproduction, a copy paper is used which can be given an electrostatic charge in the absence of light and this charge is dissipated on exposure to light. If the charged copy paper is illuminated through a translucent document to be copied or if an image of the document is projected on to the copy paper, the electrostatic charge remains in those areas corresponding to the written or printed matter of the original document, leaving a latent electrostatic image on the copy paper, which can be developed, i.e. rendered visible, by means of a developer powder, which comprises coloured fusible particles.

An electrophotographic reproduction machine desirably includes means by which copy paper from a supply within the machine, e.g. from a reel of chargeable paper, is advanced through the machine and is electrostatically charged, cut to the required size, exposed, developed and fixed and it is an object of the invention to provide an improved electrophotographic reproduction machine for carrying out these process steps in an advantageous manner.

A particular disadvantage of many known copying machines is that they involve a considerable wastage of paper, which may be specially sensitized and therefore expensive. It is a specific object of the present invention to provide an electrostatic copying machine which avoids any material wastage of copy paper.

It is a further object of the present invention to provide an electrophotographic copying machine in which the lengths of the copy sheets can be selectively varied.

It is a still further object of the invention to provide an electrophotographic copying machine in which copy sheets are cut off from a strip of copy material prior to exposure thereof.

It is another object of the present invention to provide an electrophotographic copying machine provided with means particularly adapted for advancing copy sheets and for correctly positioning such sheets for exposure.

According to the invention, an electrophotographic copying machine for producing copies of an original comprises, in combination, a copy material delivery means for supplying light-sensitive copy material in the form of a strip, cutter means for cutting said copy material supplied by said delivery device into copy sheet, copy sheet gripping means arranged to grip said copy sheets cut by said cutter means and to position said gripped copy sheets for exposure by an exposure device, whereby an image of said original is produced in said copy sheets, and developer means for developing the image on said exposed copy sheets.

Other objects and advantages of the present invention will become more apparent from the teachings of the principles thereof in connection with the disclosure of the preferred embodiments thereof in the specification, claims and drawings.

In the drawings:

FIG. 1 shows one embodiment of an electrophotographic reproduction machine in accordance with the invention in side view, partly broken away, with the front of the machine on the right;

FIG. 7 shows a vertical section of the charging device shown in FIG. 2 taken on the line VII—VII of FIG. 6;

FIGS. 8a and 8b show perspective views of the respective ends of each shielding member of the charging device of FIG. 7;

FIG. 9 shows a perspective view of a paper traversing device, which is associated with developing and fixing devices;

FIG. 10 shows a partial elevational view of FIG. 9, as seen in the direction of the arrows X—X in FIG. 9;

FIG. 11 shows a side elevational view, partly in section, of the developing device associated with the paper traversing device of FIG. 9;

FIG. 12 shows a vertical section of the developing device, taken on line XII—XII of FIG. 11;

FIG. 13 shows a fragmentary plan view taken on the line XIII—XIII of FIG. 12;

FIG. 14 shows a part-elevational part-sectional view of the fixing device associated with the paper traversing device of FIG. 9;

FIG. 18 shows another embodiment of an electro-photographic copying machine according to the invention in side view, partly broken away, with the front of the machine on the left;

FIG. 19 shows a perspective view of the cutting mechanism included in the machine shown in FIG. 18;

FIG. 20 shows a perspective view, partly broken away, of the paper advancing mechanism included in the machine shown in FIG. 18;

FIG. 21 shows a diagrammatic side view of a portion of the paper advancing mechanism shown in FIG. 18;

Reproduction Machine Housing

Figure 2:
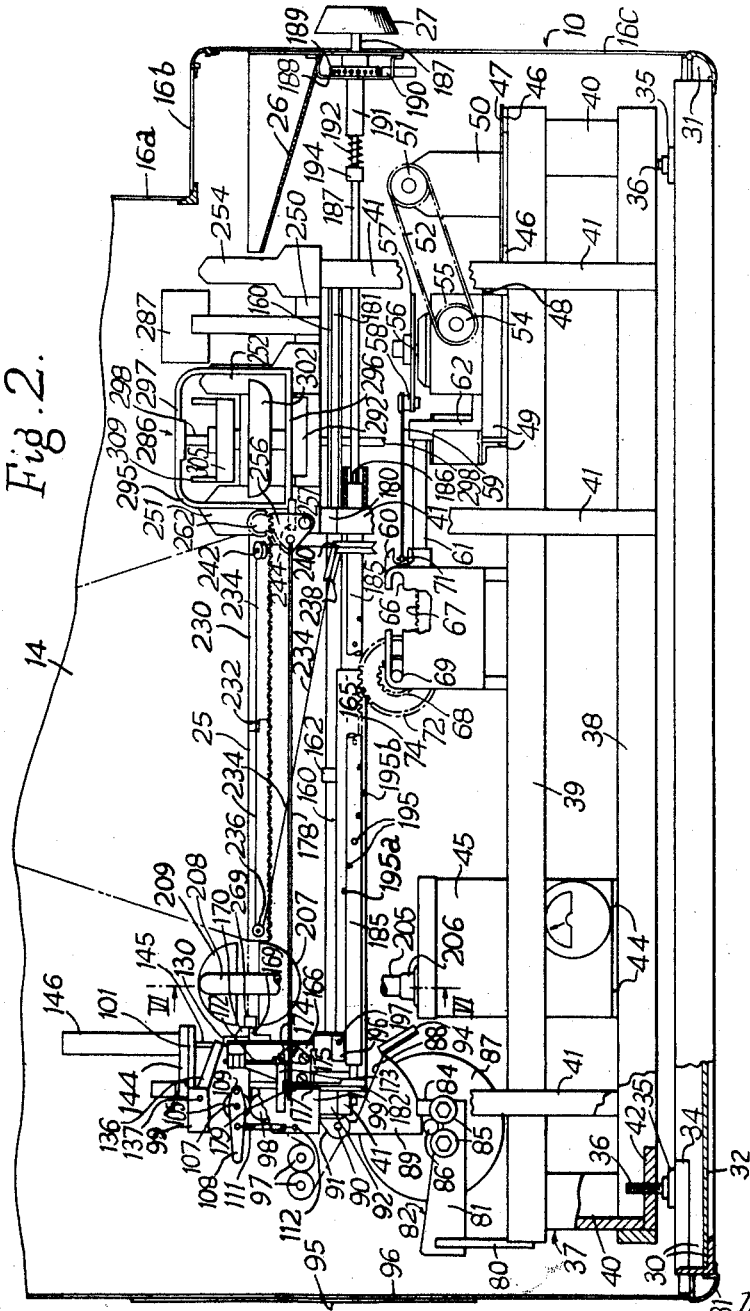
FIG. 2 shows a part-sectional side elevation of the mechanism housed within the lower part of the machine of FIG. 1.

Referring to FIG. 1, the housing of the machine comprises a cabinet 10 having a top panel 11, a main rear panel 12, side panels, one of which is shown at 14, a sloping upper rear panel 15 and a stepped front panel having an upper part 16a, a horizontal part 16b and a lower part 16c. The front panel upper part 16a provides a mounting for a rectangular opening 17 for the document to be copied, referred to as the "original" hereinafter. The rectangular opening 17 is associated with a flattening pad 18 for the original, which is mounted on cranked hinges 19 upon the cabinet 10 and is thus arranged to occupy the required position with respect to the support opening 17 for presenting in a flat state thereto written or printed matter of a wide range of thicknesses, from a single sheet to a thick book.

Within the cabinet 10, a rectangular box-like carrier 20 is provided in front of the rectangular opening 17 and, opposite the latter, the carrier 20 supports a light hood 21 of truncated conical or pyramidal form, which in turn carries a lens system 22. This is associated with a reflector 24, which may be either a mirror or a prism, so arranged that the image of an original, mounted on the pad 18 and presented to the opening 17, is focussed on illumination or exposure, as hereinafter described, by the lens system 22 and deflected and erected by the reflector 24 vertically downwards towards a support member 25 for electrosensitive copy paper.

FIG. 1 also illustrates an outlet chute 26 for developed and fixed copies, which is conveniently located in the upper portion of the front panel lower part 16c, and one of the external controls of the machine, viz, an operating wheel 27 for controlling a paper measurement or indexing device, as described in more detail below.

*General Arrangement*

Referring more particularly to FIG. 2, the cabinet 10, of which the lower part only is shown, has at its base a square or rectangular framework 30 of L-section members and the lower edges of the rear panel 12, the side panels 14 and the front panel lower part 16c are secured thereto by means of extruded seal strips 31. A base panel 32 is secured within the framework 30. Support pads 34 are welded in each corner of the framework 30 for carrying the heads 35 of levelling screws 36, which support a sub-frame, shown generally at 37.

The sub-frame 37 comprises two superposed square or rectangular frame members 38 and 39 of metal strip secured together by upright members 40 and stanchions 41, the lower frame members 38 having tapped and threaded blocks 42 at the corners for receiving the levelling screws 36. A pair of transverse support strip members 44 are disposed parallel upon opposite sides of the member 38 and support a power pack 45 for the machine. At the right-hand end as shown in FIG. 2, further support strip members 46 are disposed transversely of the upper members 39 and support a flat plate 47 and another plate 48 is carried upon a framework 49 of L-section members. An electric motor 50 is secured to the plate 47 and delivers its output to a sprocket or pulley 51 connected by a chain or belt 52 to another sprocket or pulley 54 constituting the input to a gearbox 55, which is secured to the plate 48. The gearbox 55 houses a bevel gear reduction mechanism (not shown) which drives a short upright output shaft 56 carrying a horizontal driving wheel 57. The latter carries an eccentric bush 58 to which one end of a connecting rod 59 is attached, the other end being secured to a reciprocal slide member 60. The slide member 60 is guided by means of a horizontal spindle 61 secured to a rigid support 62 affixed to the plate 43. A further pair of parallel transverse supports 64 are secured to the upper member 39 and support a pair of spaced upright plates 65 disposed longitudinally of the machine and having rectilinear slots 66 near their upper edges and gear racks 67 on their inner, facing surfaces below the slots 66. The slide member 60 is supported by a spindle 69, which fits slidingly into the slots 66. The spindle 69 also carries gear wheels 68 and 72, the gear wheels 68 meshing with the gear racks 67. The slide member 60 has a forward portion 70 carrying an upright pin 71 at its centre, for pivotally supporting the associated end of the connecting rod 59.

Each gear wheel 72, which is larger than the associated gear wheel 68, engages one of a pair of parallel gear racks 74 (see FIGS. 3 and 4), described in more detail below, for causing copy paper advance. The drive from the motor 50 to the gearbox 55 causes rotation of the wheel 57 and this is transmitted via the connecting rod 59 to the slide member 60, which thus undergoes reciprocal sliding movement on the fixed spindle 61. During this movement, the gear wheels 68 run back and forth on the gear racks 67, as guided by the spindle 69 in the slots 66, and the larger gear wheels 72 cause a correspondingly magnified reciprocal motion of the gear racks 74.

*Copy Paper Supply Device*

At the extreme left-hand end, as shown in FIG. 2, a pair of spaced uprights, one of which is shown at 80, are secured to the rear end limb of the upper member 39, and each carries a bracket 81 having a sloping upper edge 82 and an upright finger portion 84. A pair of support rollers 85 are rotatably mounted on the outside of each bracket 81 so that their surfaces project above the edge 82 and the rollers 85 carry the spindle 86 of a reel 87 of copy paper. A detecting device for indicating exhaustion of the reel 87 may be provided and may take the form of a hinged plate 88 having arcuate end pieces 89 secured to a spindle 90 which is suspended from lugs 91 secured to the outer face of a cross-member 92 joining the tops of the pair of stanchions 41 at the left-hand end of the machine sub-frame 37. The edge of the plate 88 remote from and parallel to the spindle 90 is provided with a weighted detector member 94, which causes the plate 88 to pivot as the diameter of the reel 87 decreases and to give an indication that the web of paper is nearly exhausted, as by closing the circuit of a warning light (not shown) or by other means known in the art. A removable cover member 95 is provided over an aperture 96 in the rear panel 12 for giving access to the paper supply device and, in addition, to provide a new copy paper reel 87, it is merely necessary to remove the cover member 95 and the spindle 86 of the exhausted reel and fit a new reel 87 by resting its spindle 86 on the edges 82 of the brackets 81 and allowing it to roll down until the spindle rests on the rollers 85, the finger portions 84 preventing the reel 87 from rolling beyond the rollers 85. An interlocking switch (not shown) may suitably be provided in connection with the cover member 95, to isolate all electrical circuits when the cover member 95 is removed.

Figure 4:
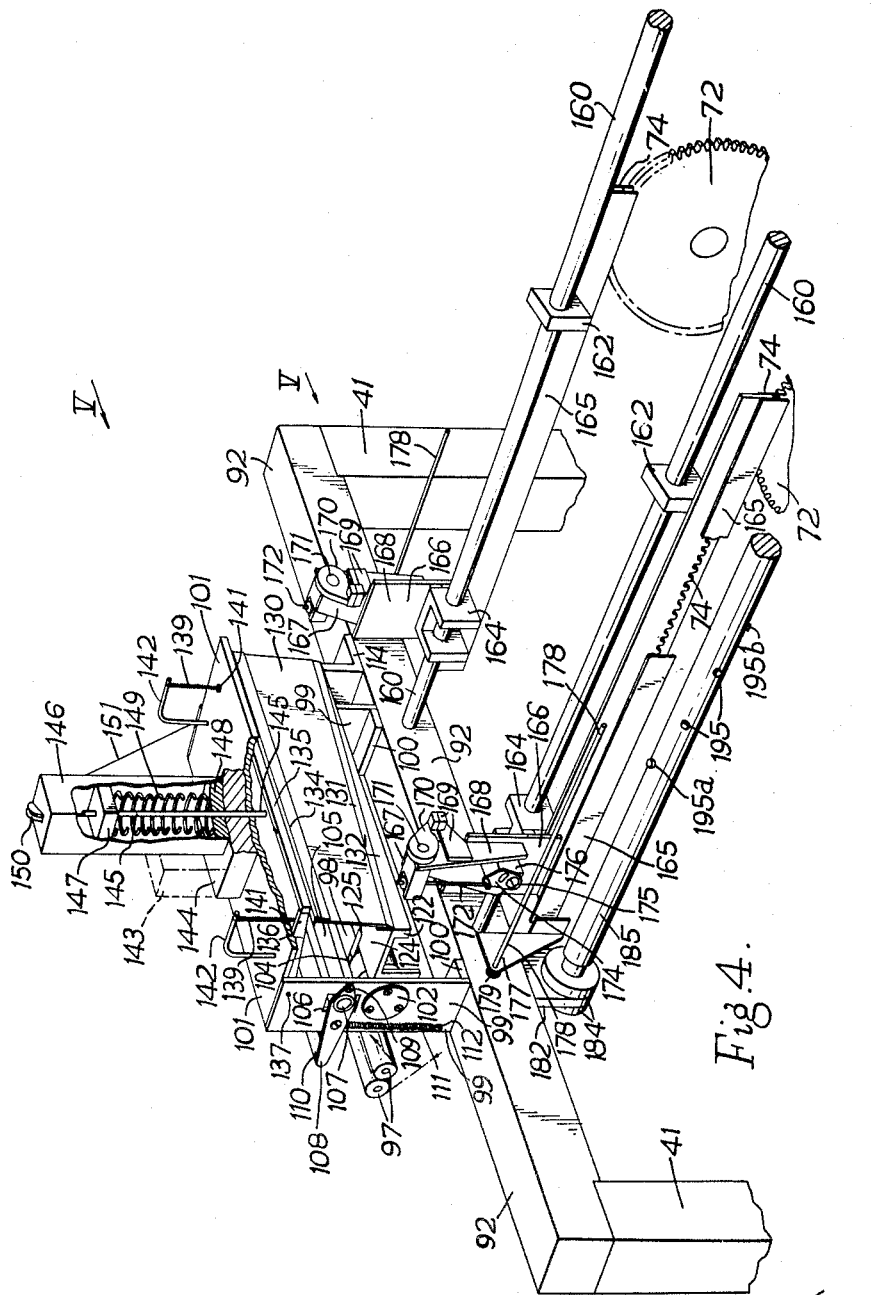
FIG. 4 shows a perspective view of the extreme lefthand part of the machine as shown in FIG. 2, illustrating the copy paper cutting device and advancing device.

Referring now to FIGS. 2 and 4, the web of copy paper from the reel 87 is taken round a pair of straightening rollers 97 and over a feed roller 98. The latter is mounted above the cross-member 92 between a pair of support plates 99 secured by blocks 100 to the cross-member 92 and braced by a horizontal plate 101 at their upper ends. The feed roller 98 is mounted by means of roller or other suitable bearings 102 secured to the plates 99 and has three spaced peripheral grooves, one of which is shown at 104 in FIG. 4. A weighted riding roller 105 rests on the feed roller 98 and its ends project through apertures 106 in the plates 99 and are secured to roller or other suitable bearings 107 in rocker arms 108. The latter are pivoted on the plates 99 by means of screws 109 and project beyond the plates 99, where their free ends are joined by a bail member 110. Each rocker arm 108 is connected between the roller 105 and the bail 110 to a tension spring 111 having its other end secured to the plate 99 at 112, whereby the riding roller 105 is resiliently urged downwardly into contact with the feed roller 98.

Figure 5:
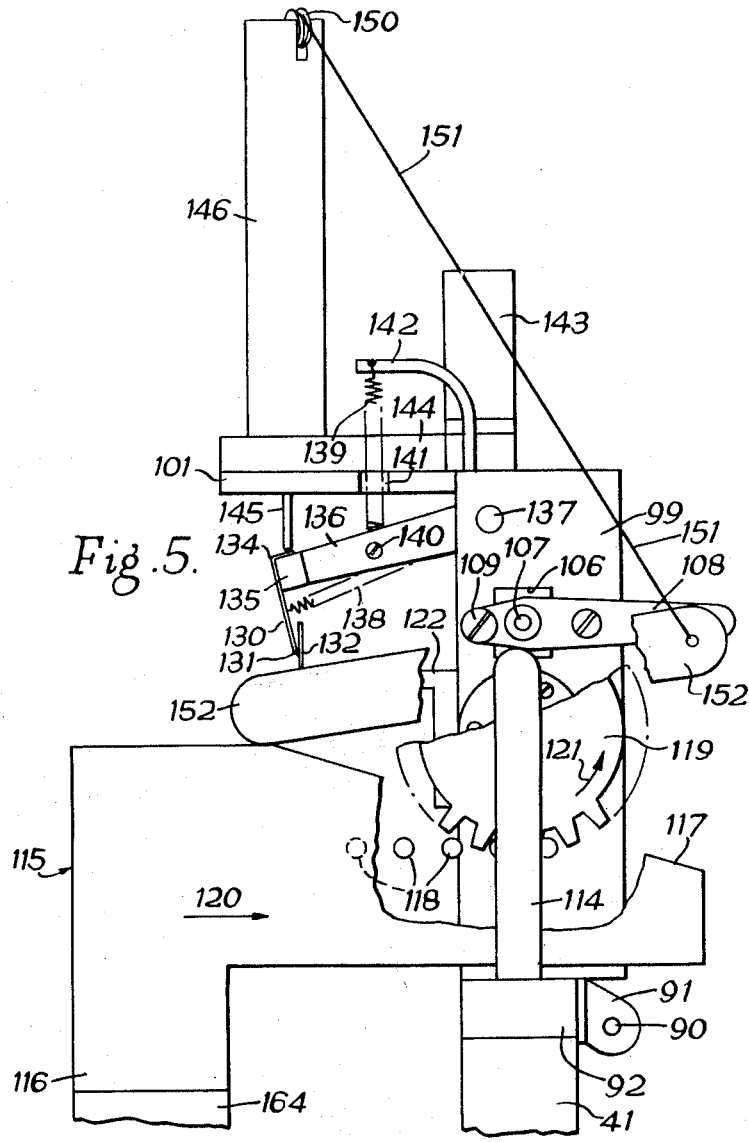
FIG. 5 shows an end elevation of the copy paper cutting device and advancing device, as seen in the direction of the arrows V—V in FIG. 4.

The feed roller 98 is intermittently driven by means of a mechanism mounted on a bracket 114 upon the cross-member 92 and shown in detail in FIG. 5. Between the bracket 114 and the adjacent support plate 99, a wedge-shaped cam is arranged for longitudinal reciprocal motion, being attached to a double slide block 164, described below in connection with FIG. 4. The cam is shown generally at 115 and includes a dependent nose-piece 116 and an inclined upper surface 117. Upon the inner face of the cam 115, a row of pins 118 is secured and these co-operate with the teeth of a ratchet wheel 119, which is mounted upon an extension shaft (not shown) rotationally connected to the feed roller 98. Movement of the cam 115 to the right, as shown in FIG. 5, according to the arrow 120 causes the pins 118 to impart a partial counter-clockwise revolution (as shown by the arrow 121) to the ratchet wheel 119, which correspondingly drives the feed roller 98, so that the copy paper is held between the feed roller 98 and the riding roller 105 is moved to the right as viewed in FIG. 2. A simple cam device (not shown) is provided so that the riding roller 105 can be lifted from the feed roller 98 so as to facilitate leading the copy paper into the machine from the straightening rollers 97.

A platform member 122 is mounted between the support plates 99, so as to provide a horizontal surface 124 at the level of the nip between the feed roller 98 and the riding roller 105, and a number of rearwardly directed prongs 125 (one of which is shown in FIG. 4) are secured to the platform member so that each prong 125 fits freely in one of the grooves 104 (FIG. 4) in the feed roller 98. The prongs 125 serve to guide the advancing copy paper forward from the feed roller 98, where it is cut to the required length by means of a guillotine knife 130 (FIGS. 2, 4 and 5).

Paper Cutting Device

The guillotine knife 130 is mounted with its slightly inclined cutting edge 131 downwards and normally resting against a counter plate 132 secured to the forward edge of the platform member 122. A hinge 134 is secured by one of its plates to the upper edge of the knife 130 and the other hinge plate carries a rigid bar 135 which, near its ends, is secured to the forward ends of link members 136, which are pivoted at 137 to the inside surfaces of the support plates 99. The knife 130 is normally urged against the counter plate 132 by means of tension springs 138 (FIGURE 5) connecting the knife 130 to the pivot points 137 of the link members 136; the knife 130 is also normally held up by means of tension springs 139 (FIGS. 4 and 5) connected at 140 to the forward ends of the link members 136 and suspended, by way of holes 141 in the horizontal plate 101, from bent arms 142 secured to the plate 101.

The guillotine knife 130 is required to operate virtually instantaneously, in order to cut the moving copy paper substantially at right-angles, and for this purpose a solenoid 143 fitted to a plate 144 (FIG. 4) is mounted upon the plate 101 above the middle of the knife 130 and controls operation of a vertical pin 145 mounted in a square-section casing 146 carried upon the housing of the solenoid 143. The upper end of the pin 145 slides in an apertured block 147 secured within the casing 146 and carries a block 148, which is secured to the vertical pin 145 near its lower end and is vertically slidable in the casing 146. A strong compression spring 149 is located between the blocks 147 and 148 and energising of the solenoid 143 releases the lower block 148 and allows the spring 149 to drive the pin 145 downwardly, where it strikes the bar 135 and rapidly moves the guillotine knife 130 downwardly to sever the copy paper web.

In order to reset the guillotine knife 130, a pulley 150 is mounted at the top of the casing 146 and a cord, wire or other cable 151 is secured to the top of the pin 145, trained over the pulley 150 and connected outside the casing 146 to one end of a rocker 152 (FIG. 5). The rocker 152 is pivoted to the upper end of the bracket 114 and the opposite end of the rocker 152 (which may comprise a roller) rides on the inclined upper surface 117 of the wedge-shaped cam 115. As the latter is moved in the direction of the arrow 120 to advance the copy paper as previously described, the surface 117 contacts the forward end of the rocker 152, pivots it clockwise and the corresponding traction exerted on the cable 151 raises the pin 145 and the block 148 which is then reset in its upper position by a latch (not shown) attached to the solenoid 143 and operated by a return spring (also not shown). As the pin 145 is lifted, the springs 139 lift the knife 130 into its position ready for further cutting operation, so that the same movement of the cam 115 resets the guillotine knife 130 and advances the copy paper beyond the forward edge of the counterplate 132 and the cutting edge 131.

Copy Paper Advancing Device

Figure 6:
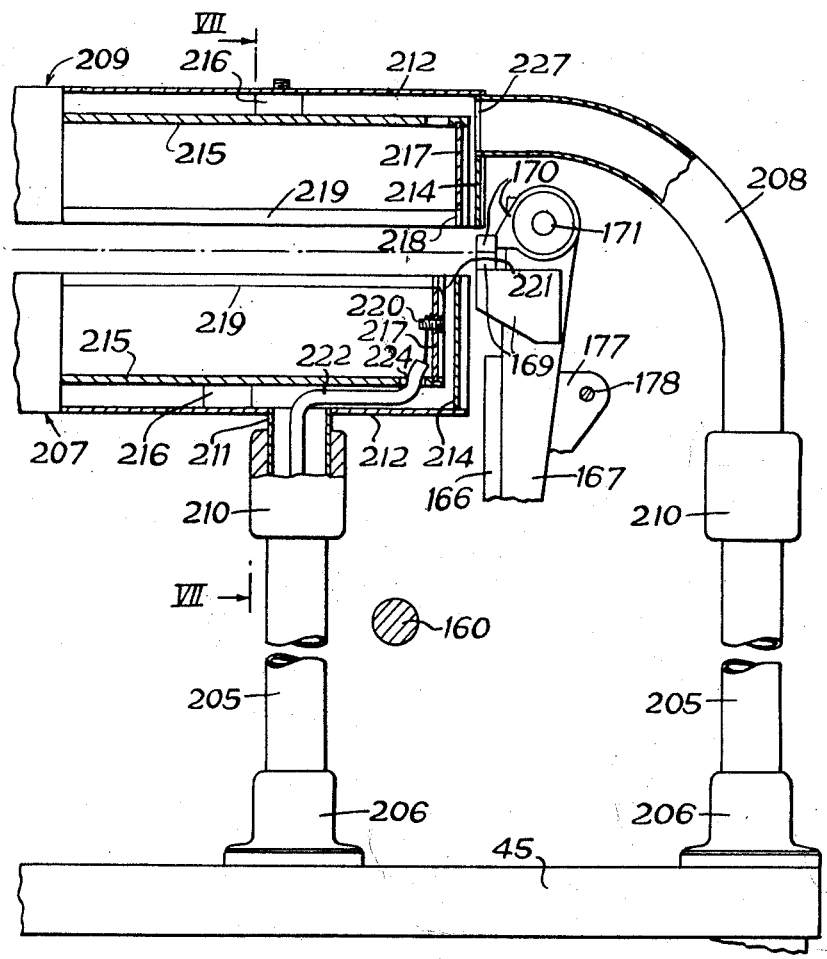
FIG. 6 shows a section of the electrostatic charging device taken on the line VI—VI of FIG. 2.

In order to advance the copy paper through the charging and exposure stages of the process, a copy paper advancing device is provided, as shown in FIGS. 2, 4 and 6.

A pair of parallel, horizontal guide members in the form of spindles 160 are secured to the cross-member 92 and project longitudinally of the machine to another cross-member (not shown) connecting the upper ends of the stanchions 41 adjacent the front panel part 16c. The spindles 160 are mounted slightly above and inwards of the gear wheels 72 and the gear racks 74 running thereon are carried slidingly upon the spindles 160 by means of slide blocks 162 adjacent the forward ends of the gear racks 74 and double slide blocks 164 adjacent their rearward ends. The teeth of the gear racks 74 are enclosed in pairs of side plates 165.

The double slide blocks 164 support paper grippers for seizing the edges of the copy paper web. These grippers each comprise a vertical mounting plate 166 secured to the slide block 164, carrying an angle bracket 167. The angle bracket 167 includes a transverse portion 168 which carries an inwardly directed, fixed lower gripper jaw 169 and a correspondingly pivotable upper gripper jaw 170. The latter is mounted on a spindle 171 actuated by means of a rocker pin 172 from a slotted cam 174 mounted at 175 upon a block 176 secured to the other portion of the angle bracket 167. The operation of the cams 174 is brought about by two fixed catch plates 173 (shown in FIG. 2, but omitted from FIG. 4 for clarity), which are mounted on each vertical plate 99, and, at the other end of the travel of the grippers, by two similar catch plates 244 (FIG. 2) mounted on shaft support plates 251 (see FIG. 9, described below). Similarly, catch plates are also attached to the left-hand stanchions 41. The catch plates 173 contact the cams 174 at the left-hand limit of their travel and so close the gripper jaws 169 and 170. The cams 174 are driven slightly over centre to ensure that the jaws 169 and 170 are locked closed. The catch plates 244 on the shaft support plates 251 contact the cams 174 and reverse them at the other end of their travel, so as to open the jaws 169 and 170, when the copy paper has been positioned ready for exposure by the movement of the slide blocks 164 carrying the grippers. Actuation of the cams 174 causes the upper jaws 170 to pivot, so as to open and close the grippers as required. At their extreme rear ends, the outer side plates 165 of the gear racks 74 support a bracket or brackets 177 which slidingly support a rod or rods 178 for effecting paper advance from the exposure stage to the developer stage, as described below.

Figure 3:
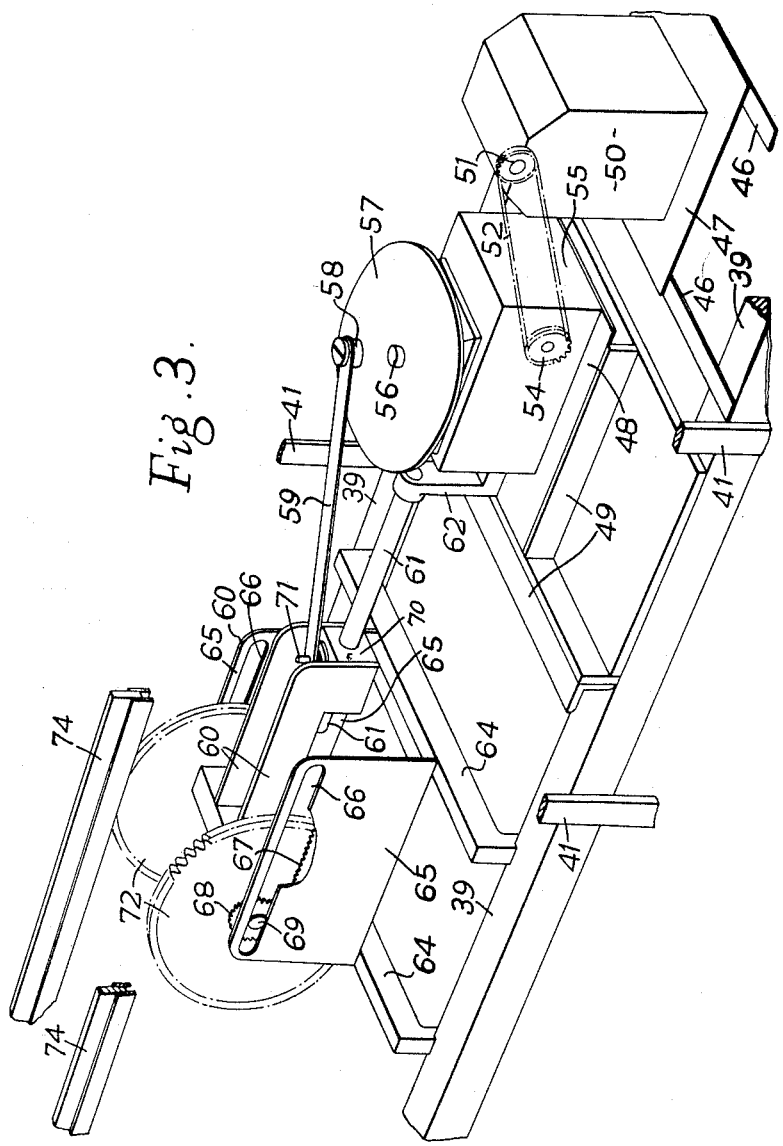
FIG. 3 shows a perspective view of a driving arrangement for providing advancing movement of the copy paper.

As a severed portion of copy paper, i.e. a copy paper sheet, is taken through the machine from the exposure position, the next portion of the web, which has been advanced under the knife 130 by actuation of the ratchet wheel 119 as described above, is seized by the jaws 169, 170 of the grippers, which grip each edge by the leading, i.e. cut, edge of the web. The previously described reciprocal motion of the slide member 60 caused by operation of the motor 50, as shown in FIG. 3, causes rotation of the large gear wheels 72 and corresponding forward movement of the gear racks 74 and the parts associated therewith, namely the slide blocks 162 and 164, which support the moving parts by sliding on the spindles 160, the grippers attached by the double slide blocks 164, the cam 115 (FIG. 5) and the bracket 177, which slide relative to the rod 178 which remains stationary during this part of the operation. Adjustable stop nuts 179 are mounted on the rod 178 and the bracket 177 strikes these nuts 179 on return movement of the slidable parts. The copy paper is drawn forward by the grippers and between the electrodes of a copy paper charging device, described below, by an adjustable amount as governed by a paper measurement or indexing device, which can be set by the machine operator to cause operation of the guillotine to cut off a copy paper sheet of the required length to suit the size of the original being reproduced.

Copy Paper Indexing Device

A further pair of the stanchions 41 are secured to the sides of the sub-frame 37 in the vicinity of the vertical plate through the front edge of the copy paper support 25 and, at the tops of these stanchions 41, partial cross-members 180 (FIGS. 2 and 9) are secured, which are braced to the cross-member 161 by means of rigid longitudinally-disposed rods 181. Dependent lugs 182 are secured to the undersides of the cross-member 92 and one of the cross-members 180 and carry bearings 184, in which a shaft 185 is rotatably mounted. Adjacent the lug 182 attached to the associated cross-member 180, the shaft 185 is rotationally coupled by a pin and slot connection 186 to a rod 187 which extends outside the machine cabinet 10 via the lower front panel 16c and carries the indexing wheel 27 (FIGS. 1 and 2) on its end. Immediately within the cabinet 10, a shallow well 188 (FIG. 2) surrounds the rod 187 and the latter carries a click wheel 189 and associated ball catch 190. The rod 187 passes through the well 188 and a sleeve 191 secured thereto and a compression spring 192 surrounds the rod 187 between the sleeve 191 and a stop member 194 carried on the rod 187, so that the spring 192 urges the rod 187 to the left (FIG. 2) and ensures that the pin and slot connection 186 remains engaged.

A number of studs 195 (FIGS. 2 and 4) are disposed round the shaft 185 in a helical arrangement preferably at a uniform axial spacing of, for instance, 1 in. or 1 cm. (though any other stud spacing may be adopted) and, as will be readily appreciated, the click wheel 189 and ball catch 190 are arranged so that each position thereof corresponds to one of the studs 195, so that rotation of the rod 187 and the shaft 185 sets one of the studs 195 into its operative position. A micro-switch 196 (FIG. 2) is mounted on one of the gripper double slide blocks 164 so that its actuating pin 197 lies in the path of whichever stud 195 is rendered the operative one by rotation of the indexing wheel 27. If the first stud 195a (FIG. 4) is placed, say, 6 ins. from the starting position of the micro-switch pin 197 and the others are spaced at 1 in. intervals, a length of paper is cut off by the guillotine knife 130 of, for instance, 9 ins. by setting the indexing wheel to "4," corresponding to the fourth stud 195b (FIG. 4) which operates the pin 197 as the grippers slide forward on the spindles 160. The wheel 27 may alternatively and preferably be graduated in accordance with the actual length of copy paper cut off. The microswitch 196 controls operation of the guillotine solenoid 143 to cause severing of the moving copy paper web as the switch pin 197 engages the stud 195b and, as the spring 149 causes substantially instantaneous cutting operation of the knife 130, the copy paper web is severed substantially at right-angles to its direction of advance and to the length set by the indexing wheel 27 according to the size of the original.

Instead of the helically placed series of studs 195, a steplessly variable arrangement may be provided, if desired, by mounting a continuous worm of long pitch on the shaft 185, the worm making 1 revolution round the shaft 185. In this case, the wheel 27 may carry a graduated scale and co-operate with a pointer or mark on the cabinet 10 and the click wheel 189 and ball catch 190 may be replaced by a device for maintaining the wheel 27 and thus the shaft 185 and the worm in the position to which they are set.

Copy Paper Charging Device

As the copy paper sheet is advanced by the grippers, it is given a blanket electrostatic charge by means of a charging device, shown in FIGS. 2, 6, 7, 8a and 8b.

Four tubular uprights 205 are mounted transversely of the direction of copy paper advance upon foot members 206 secured to the top of the power pack 45. The inner pair of uprights 205 carry a lower electrode assembly, generally indicated at 207, and the outer pair carry, by means of inwardly curved tubular extensions 208, an upper electrode assembly, generally indicated at 209. The upper assembly 209 has a slightly greater width than the lower assembly 207, as shown in FIG. 6.

Union members 210 fixed to the upper ends of the uprights 205 carry short tubes 211 to which an upwardly open brass shell 212 of semi-circular section is secured. A semi-circular disc 214 of insulating material is affixed at each end of the shell 212 and a similar shell-like support member 215 is mounted concentrically within the shell 212 upon spacers 216. The member 215 is grooved at each end and a semi-circular support 217 is fitted into each groove, the member 215 and support 217 being made of insulating material. A pair of spaced slots 218 are formed in the support 217 symmetrically about the mid-point of its straight edge and an electrode 219 comprising a length of tungsten wire, which may be from 0.0005″ to 0.003″ and preferably 0.001″ in diameter, is trained in two runs between the pair of slots 218 in the two supports 217.

At one end of the member 215, a conductive stud 220, of silver for instance, is located in the support 217 beneath the slots 218 and a U-shaped wire 221 is secured to the stud 220 by passing one of its limbs through a hole therein, the ends of the wire electrode 219 being secured to the other limb of the wire 221 (FIG. 8b). Inside the support 217, the stud 220 is connected to a conductor 222 which passes through a hole 224 in the support member 215 and down one of the tubular uprights 205 to the power pack 45. At the other end of the member 215, a pair of tags 225 (FIG. 8a) are secured to the support 217 beneath the slots 218 and the wire electrode 219 is secured to the tags 225 by means of tension springs 226, which maintain the tungsten wires 219 in tension.

The other electrode assembly 209 is constructed similarly, except that the curved tubular extensions 208 terminate in apertures 227 in the discs 214.

The whole assembly of the charging device is particularly neat and safe in construction as the enclosed nature of the wire electrodes 219 eliminates the possibility of an operator touching them. In operation, the upper pair of electrodes, constituted by the tungsten wires 219, are maintained at from 5000 to 10000 negative volts and the lower pair at a similar positive voltage.

Exposure Device

As will be appreciated, the lens system 22 and reflector 24 (FIG. 1) cause an image of an original inserted in the rectangular opening 17 and held by the pad 18 to be projected on to the copy paper support 25 (FIGS. 1 and 2). Continued advance of the sliding parts carried on the spindles 160 brings the charged copy paper sheet on to the support 25, where it is exposed for an appropriate period to illumination to cause the electrostatic charge to dissipate in accordance with the graduation of the image of the original which has fallen thereon. In order to keep the copy paper flat during exposure, the support 25 is associated with a variable length vacuum box 230 (FIG. 2), the upper surface of which is uniformly preforated, which is continuously subjected to suction by means of a fan the exhaust air from which is ducted away to the fusing device, described below, for cooling purposes. In order to render the effective length of the vacuum box 230 adaptable to the length of the copy paper measured by the indexing device, a movable baffle 232 is provided which is connected to a cable 234 trained around a pulley 236 at the edge of the support 25 adjacent the charging device, then a further pulley 238 and a driving pulley 240, attached to the studded shaft 185 adjacent the partial cross-member 180, and then round a further pulley 242 and back to the baffle 232. As actuation of the indexing wheel 27 rotates the shaft 185, the driving pulley 240 operates the cable 234 to pull the baffle 232 into the corresponding length position along the vacuum box 230. The suction maintains the copy paper flat in the exposure device and yet permits movement of the paper, after exposure, to the next stages of the reproduction process, in which the latent electrostatic image on the copy paper is developed and fixed.

Paper Traversing Device

Referring to FIGS. 2, 9 and 10, the severed copy paper is advanced upon the support 25 while subject to suction from the vacuum box 230, as it is held by the jaws 169 and 170 of the grippers. When the grippers reach the forward limit of their travel over the vacuum box 230, they are opened to release the paper by contacting the catch plate 244 (FIGS. 2 and 9) and return to their original position through reverse movement of the gear racks 74. While this return motion is taking place, exposure is effected. On reaching their extreme left position, the grippers strike the other catch plate 173 (FIG. 2) and close upon the new leading edge of the copy paper web. In the last part of this movement, the bracket 177 strikes the stop nuts 179 and pulls the rod 178 to the left, the purpose of which is described below.

In order to continue the advance of the severed and now exposed copy paper, a paper traversing device is provided which is mounted on the cross-members 161 and 180. These are connected at each side by L-section supports 250 (FIGS. 2 and 9) each of which carries three spaced upright shaft support plates 251, 252 and 254 in opposed pairs and the L-section supports 250 are joined by distance rods 255. One of the support plates 251 nearest the vacuum box 230 carries a geared quadrant 256 pivoted at 257 and urged clockwise (as shown in FIG. 9) by a spring 258 connected at 259 to the quadrant 256 and at 260 to the L-section support 250. The geared quadrant 256 is pivotally connected at 261 to the associated rod 178. The quadrant 256 meshes with a gear wheel 262 and this is mounted on a shaft 264 (FIG. 9). Above the shaft 264, a further shaft 265 spans the bearing plates 251 and its ends project through upright slots 266 and terminate in stop bushings 267. At the spacing of the web of copy paper, the shafts 264 and 265 carry wheels 268 for driving the edges of the paper web. This is achieved by the afore-mentioned leftward movement of the bracket 177 (FIG. 2) striking the stop nuts 179 and pulling the rod 178. This in turn pivots the quadrant 256 against the action of the springs 258 and causes clockwise rotation of the gear wheel 262 and thus of the shaft 264 and the wheels 268.

At the same time as the gripper jaws 169 and 170 open to release the copy paper, a cam plate 269 (FIGS. 2 and 9) which is mounted between the grippers enters the nip between the pairs of wheels 268 and so raises the shaft 265, so that the paper is thus transferred from the grippers to the pairs of wheels 268. The action of the quadrant 256 continues this forward movement of the copy paper, thereby carrying the now charged and exposed paper forward to the developing and fixing devices.

Rods 270 brace the upper ends of the pairs of plates 251, 252 and 254 and each pair carries a fixed rotatable shaft 271 and another, vertically-movable shaft 272, the latter projecting through slots 274 and terminating in bushings 275. The shafts 271 are mounted in bearings 276 and project through the plates 251, 252 and 254 at one side of the machine and terminate in sprockets 277 (see FIG. 10). On this side, further sprockets 278 (FIG. 10) are mounted upon the plates 251, 252, 254 beneath the sprockets 277 and adjacent the L-section support 250 and one of the sprockets 278 is connected at 279 to a bevel gear 280, which meshes with a bevel pinion 281 mounted upon a driven upright shaft 282. In order to provide appropriate adjustment of the shaft 282, this is not driven from the motor 50, but is driven by a coupling, belt or chain from a separate, variable-speed motor or by means of a separate motor and a variable gearbox associated therewith. In this way, the three shafts 271 are continuously driven. They carry double wheels 285 which engage similar wheels 285 in pairs, the latter being carried upon the vertically-movable shafts 272.

As the quadrant 256 rotates the wheels 268 on the shafts 264 and 265 to advance the copy paper sheet, it is received in the nip between the pairs of wheels 285 on the shafts 271 and 272 carried by the plates 251 and advanced successively to the other pairs of wheels 285 and into the discharge chute 26 (FIGS. 1 and 2). The copy paper developing device is mounted between the shafts 271 and 272 carried by the plates 251 and those carried by the plates 252; the fixing or fusing device is mounted between the shafts 271 and 272 carried by the plates 252 and those carried by the plates 254. The developing device is shown generally at 286 in FIG. 2 and the fusing device at 287.

Developing Device

Referring more particularly to FIGS. 11 and 12, the developing device 286, by which the copy paper now carrying a latent electrostatic image of the original is treated with an iron powder/toner powder developer, is similar in its general construction to the apparatus disclosed in U.S. specification No. 2,786,441. A number of constructional improvements are incorporated in the developing device included in the electrostatic reproduction machine shown in the drawings.

An elongated rectangular framework comprising main members 290, intermediate members 291 and end members 292 bridges the pair of L-section supports 250 (see also FIG. 9) in a reduced height position 294 between the side plates 251 and 252. At each end, this framework supports a pair of mounting members 295 upon cross-pieces 296 secured to the main members 290, the upper ends of the members 295 being curved inwardly and being joined by a bridge piece 297. Centrally, each cross-piece 296 carries an upright shaft 298, one of which has a gear train 299, 301 secured thereto, and each shaft 298 supports a bowl-shaped developer powder container 302 for rotating about the shaft 298 but in the opposite sense thereto. Above each bowl-shaped container 302, a driving wheel 304 is mounted and a toothed rubber belt 305 is trained round the two driving wheels 304 so as to pass across the machine in two runs above the advancing copy paper sheet moving between the pairs of wheels 285 (FIG. 9). To ensure good mixing, each bowl 302 rotates at approximately half the rotational speed of the driving wheels 304. This ensures rapid and thorough mixing of the iron particles/developer powder without spillage. On its vertical outer surface, the belt 305 carries a large number of magnetic pole pieces 306 which include an overhung portion 307. In order to maintain the pole pieces 306 at uniform distance above the copy paper, the overhung portions 307 ride along a brass rail 308. This permits the belt 305 to be run at a minimum tension and thereby prevents stretching and frequent adjustment, while at the same time it maintains the uniform distance from the copy paper sheet referred to above.

Elongated stationary pole pieces 309 are arranged between the belt runs above and to the inside of the carrying rails 308. The elongated stationary pole pieces 309 are staggered in such a way that the moving pole pieces 306 move out of the region of the elongated stationary pole pieces 309 on arriving above a bowl 302. Extending between the bowls 302 is a shallow U-section pole piece 310 having a thin non-magnetic flat plate 311 upon its upper limits. These parts are mounted upon uprights 312 affixed to the intermediate members 291 of the framework and the pole piece 310 completes the magnetic circuit and ensures that the magnetic lines of force pass vertically through the copy paper. Vanes, which for clarity have not been shown in the drawings, are fixedly mounted on the mounting members 295 so as to project into the bowls 302 and, as the latter rotate, the developer powder therein is lifted by these vanes into the path of movement of the pole pieces 306 and the iron powder or carrier in the developer powder causes ferro-magnetic brushes to form on the pole piece 306, which are then swept across the upper surface of the copy paper and the toner powder thereby becomes attracted to the charged portions constituting the latent electrostatic image. The ferromagnetic brushes thus pass twice over the copy paper and ensure good development. The dusted copy paper then advances to the fusing or fixing device 287 and the developer powder, now somewhat depleted of toner powder, is deposited in the other bowl 302 from that from which it was picked up and remixed with the developer powder therein. Arrangements are provided for supplying toner powder to one or both of the bowls 302 in order to replenish the developer powder.

*Fusing Device*

Figure 15:
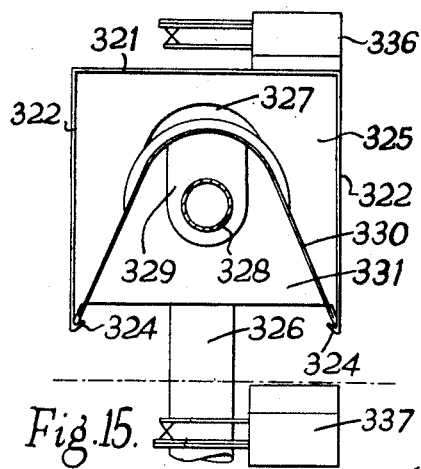
FIG. 15 shows a section of the fixing device taken on the line XV—XV of FIG. 14.

Referring to FIGS. 2, 14 and 15, the fusing or fixing device 287 comprises a casing 320 which is open at the bottom and includes an upper wall 321, side walls 322, the lower edges of which are inturned as at 324, and end walls 325. The casing 320 is supported by tubes 326 fixed to the end walls 325 and supported in turn on the L-section members 250 (FIG. 9). Each end wall 325 also has connected to it a cooling air duct 327, one of which serves as the inlet duct and is connected to the exhaust from the fan (not shown) used to withdraw air from the vacuum box 230 (FIG. 2). An infra-red quartz heating tube 328 is mounted longitudinally of the casing 320, being suspended by lugs 329 from an elongated reflector 330 of generally inverted U-section, the axis of the heating tube 328 lying at one focus of the reflector 330, which approximates in section to a half ellipse. The copy paper sheet moves in a plane through the minor axis of this ellipse and therefore an image of the filament of the heating tube 328 is projected on to the copy paper, which thus becomes intensely heated to fuse the toner powder adhering thereto. The ends of the reflector 330 are enclosed by plates 331 which are apertured to pass over the tube 328. This is connected to terminals 332 which are connected to a source of electric current by leads 334, which pass through grommets 335 in holes in the end walls 325 of the casing 320 and down the support tubes 326. The long dependent lower edges of the reflector 330 are supported in the inturned parts 324 of the casing side walls 332. Bimetal thermostatic switches 336 and 337 are provided above and below the casing 320, as a safety measure in case the paper should jam or the cooling air supply fail. If any such mishap causes the lower switches 337 not to be shielded from the tube when it is energized, the heat opens the switches to de-energize the tube 328 and prevent damage to the machine or the copy paper.

The fixed copies are discharged from the machine via the chute 26. The machine is particularly simple to operate since it includes very few external controls. In order to copy an original, the operator opens the support pad 18 (FIG. 1) by hinging it away from the front panel upper part 16a, lays the original on the pad 18 and secures it thereon by means provided in appropriate relation thereto according to its size, such as elastic straps or spring clips or the like, positioned so that the original can be fixed in place without any of the written matter being obscured. The original must be disposed on the pad 18 so that its image will register with the appropriately measured or indexed length of copy paper. This is arranged for by setting the indexing wheel 27 according to the length dimensions of the original, whereby a corresponding length of copy paper is cut off by the guillotine knife 130. The image is made to correspond with the copy paper by always setting the original in the appropriate place on the pad 18, as by placing one edge of the original against a datum line marked on the pad 18, and, most suitably, adjacent its hinge axis. The machine operator then closes the pad 18 against the opening 17. The length of the original is noted and the indexing wheel 27 is set to the appropriate position. The machine is then operated, on actuation of push buttons on a control panel, which can simply comprise an on-off button and a control disc graduated in numbers of copies from 1 to, say, 100. If 10 copies are required, for example, the control disc is set to "10" and this pre-sets micro-switches to effect 10 reciprocal movements of the grippers. The on-off switch is arranged to energise the power pack, the guillotine solenoid circuit, the copy illumination lamps, the developing device, the fusing device and the motor 50. At the instant the motor 50 operates, the guillotine 130 is set to operate upon actuation of the switch 196, the shutter of the exposure device is set to operate upon actuation of another micro-switch. It will be appreciated that when the reproduction machine is in use the copy illumination lamps are on all the time. Variation of exposure is arranged for by means of a wedge cam device adjustable for time of exposure, which is actuated by means of a solenoid. Adjustment is effected by means of a dial on the front of the cabinet. The developing device 286 operates, by means of a micro-switch, on the approach of the copy paper sheet, to produce ferro-magnetic brushes on the moving pole pieces 306 and also the fusing device 276 becomes heated, on approach of the copy paper sheet. Operation of the motor 50 then causes 10 revolutions of the driving wheel 57, which produces 10 reciprocal movements of the grippers on the guide members (the spindles 160). At the beginning of each reciprocal movement, the grippers seize the leading edge of the copy paper and advance it through the charging device and over the vacuum box 230. During this movement, the micro-switch 196 contacts the appropriate stud 195 on the shaft 185 to operate the guillotine knife 130 and, when the copy paper is correctly positioned on the vacuum box 230 between the baffle 232 (which has been set to the required position by setting the indexing wheel 27) and slightly beyond the front end of the vacuum box 230, the sliding parts contact micro-switches to bring about exposure, a suitable delay-action shutter attached to the lens 22 and operated by the micro-switches referred to giving the correct exposure. The grippers are then opened by contacting the catch plate 244 and, at this moment, the leading edge of the copy paper is inserted just into the two sets of wheels 268. Reverse movement of the grippers then occurs with the leading edge of the copy paper held between the wheels 269 (FIG. 9) and exposure is effected during this time. As the reverse movement ends, the bracket 177 strikes the stop nuts 179 to pull the rod 175 and effect rotation of the wheels 268, as described, to cause the paper to advance into the traversing mechanism, which is continuously driven from its motor via the shaft 282 (FIG. 10). At the same time, the guillotine is reset in the open position and the leading edge of the copy paper is advanced slightly beyond the knife 130 by the cam 115 (FIG. 5). The same sequence of operations is then repeated as the driving wheel 57 (FIGS. 2 and 3) undergoes the second of the 10 revolutions. The first, i.e. exposed, sheet of copy paper is advanced by the traversing device firstly through the developing device 286, where the latent electrostatic image is developed by the toner powder, and then through the fusing device 287, where the toner powder loosely adhering to the electrostatic image is fixed. The next copy sheet is then developed and fixed and so on until the desired 10 copies are delivered via the chute 26, when the machine stops. In addition to the steps outlined above, it is merely necessary for the operator to supply a new charge of toner powder to the developing device, say after each 50 copies or when the intensity of the copies lessens appreciably, or alternatively to operate periodically a toner supply button to release part of a large quantity of toner powder stored in the machines, or alternatively this may be effected automatically or semi-automatically and to note actuation of the warning light or other alarm device which indicates that a new reel of copy paper is required.

*Alternative Construction of Copy Paper Indexing Mechanism*

Figure 17:
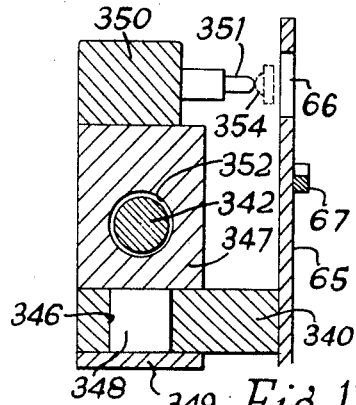
FIG. 17 shows a section taken on the line XVII—XVII in FIG. 16.
Figure 16:
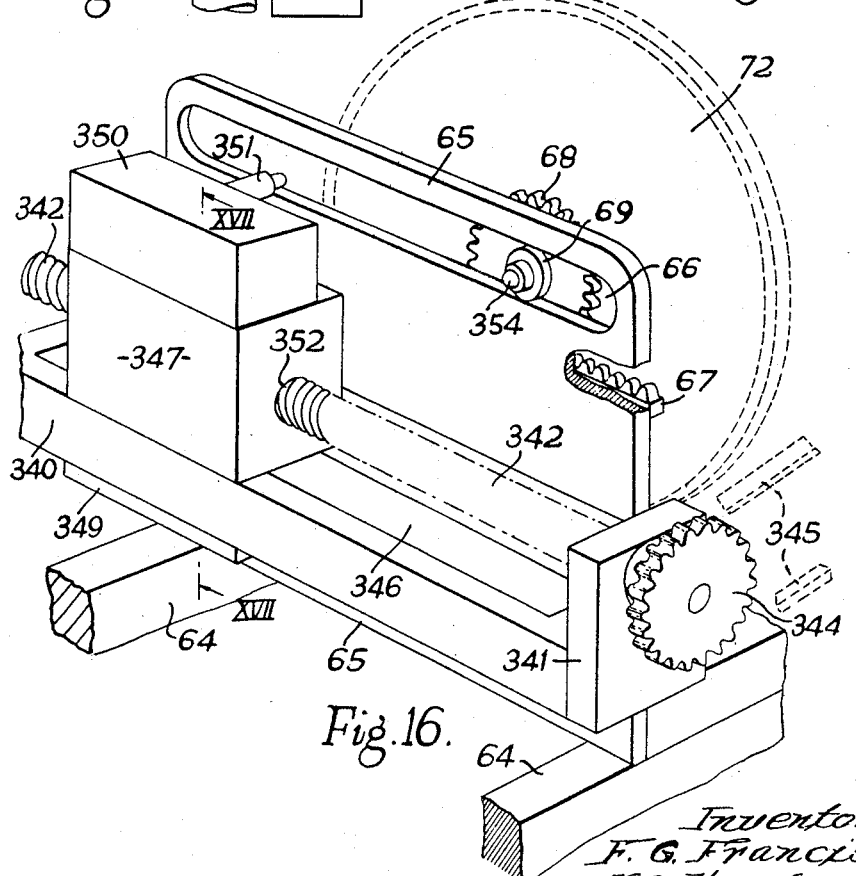
FIG. 16 shows a perspective view of an alternative copy paper indexing device which may be employed in place of that illustrated in FIGS. 2 and 3.

Referring to FIGS. 16 and 17, alternative copy paper indexing device is shown, which is designed to provide actuation of the guillotine knife 130 when the grippers have advanced by the desired amount, according to the setting of the indexing wheel 27. Instead of providing the studded shaft 185 and mounting a co-operating micro-switch 196 on one of the double slide blocks 164, as shown in FIGS. 2 and 4, one of the upright plates 65, having the slot 66 in which the spindle 69 carrying the gear wheels 68 and 72 runs, has a fixed block 340 secured along its outer side and extending slightly beyond the plate 65. An upright block 341 is secured to one end of the block 340 and this has a hole therein in which a long screw-threaded shaft 342 is freely rotatably mounted so as to lie parallel to and above the block 340. On the outside of the block 341, the end of the shaft 342 carries a sprocket or pulley 344, which is connected by a chain or belt 345 to another pulley or sprocket (not shown) mounted on the shaft 187 connected to the indexing wheel 27.

A long slot 346 parallel to the shaft 342 is provided in the block 340 and a slide block 347 is mounted on the block by means of pins 348 (FIG. 17), which fit into the slot 346, and an attached guide plate 349 under the block 340. The latter supports a mirco-switch 350 having an operating plunger 351 and the slide block 347 has a threaded hole 352 which receives the screw-threaded shaft 342. Rotation of the index wheel 27 is transmitted via the shaft 187 and the sprockets of pulleys and the chain or belt to the shaft 342 and rotation of this causes rectilinear sliding movement of the slide block 342 and thus of the micro-switch 350. The switch plunger 351 becomes positioned at a certain distance from the ends of the slot 66 when the indexing wheel 27 is set to suit the length dimension of the original being copied. The micro-switch 350 is actuated to operate the solenoid 143 to operate the guillotine knife 130 by a ball cam 354 provided on the end of the spindle 69, the block 347 being so dimensioned that the switch plunger 351 and the ball cam 354 lie at the same height.

By this means, the micro-switch 350 is positioned when the indexing wheel 27 is adjusted and is actuated when the motor 50 (FIGS. 2 and 3) causes the spindle 69 to move in the slots 66 so as to effect advance of the grippers. The travel of the micro-switch 350 is proportioned, by selecting the dimensions of the shaft 342 and the drive ratio from the shaft 187 accordingly, so that it becomes positioned and is correspondingly actuated at the required point in the travel of the grippers.

The construction shown in FIGS. 16 and 17 has the advantage that the micro-switch 350 only requires to undergo a proportion, e.g. a quarter, of the travel of the grippers, unlike the micro-switch 196 in the construction shown in FIG. 2, and this simplifies the electrical connections between the switch 350 and the solenoid 143.

FIG. 18 shows another type of electrophotographic copying machine embodying the invention. The housing has been removed to show the mechanism and, also, tapes, which advance the copy paper sheets and which are described in more detail hereinafter, have been omitted from FIG. 18 to avoid confusion.

*General Arrangement*

The framework of the machine is formed mainly by channels of rectangular cross-section, and comprises a pair of lower beams 400 fixed at one end to uprights 401 and at the other end to shorter uprights 402. Horizontal beams 403 are fixed between the uprights 402 and an end pair of uprights 405 and serve to support a lower platform 406. The tops of the uprights 401 are fixed to a horizontal beam 407 and two further uprights 408 are joined at their tops by an L-section channel 409. Two cross-struts 410 fixed on the lower beams 400 support an electric motor 412 and the platform 406 supports two side plates 413 and 414 across the tops of which extends an upper platform 415.

*Paper Advancing Mechanism*

The electric motor 412 is coupled by its shaft 416 to a gear box 417 which in turn drives a shaft 418. The shaft 418 carries a sprocket wheel 420 connected by a chain 421 to a further sprocket wheel 422. The sprocket wheel 422 is keyed to a shaft 424 which is journalled at one end in a support bracket 425 secured to the top of the lower platform 406 and at its other end in the side plate 414. A gear wheel 426 is also keyed to the shaft 424 and has teeth, over only half of its circumference, which mesh with a gear wheel 427, which is carried on a shaft 428 journalled in the side plate 413. The gear wheel 427 meshes with a further gear wheel 429 keyed to a shaft 430. The shaft 430 is journalled in roller bearings (not shown) in the side plates 413, 414 and carries a roller 431 around which is led the paper strip 432 unwound from the reel 433. An in the previous embodiment, the reel 433 is carried on a spindle 434 supported by wheels 435 which are rotatably mounted on a support bracket 436. Thus to install a reel of paper in the machine, the spindle 434 is placed on the upper edge 437 of the bracket 436 and allowed to roll on to the wheels 435, the bracket 436 having an upturned portion 438 for preventing the spindle 434 from rolling off the bracket.

*Paper Cutting Device*

Figure 23:
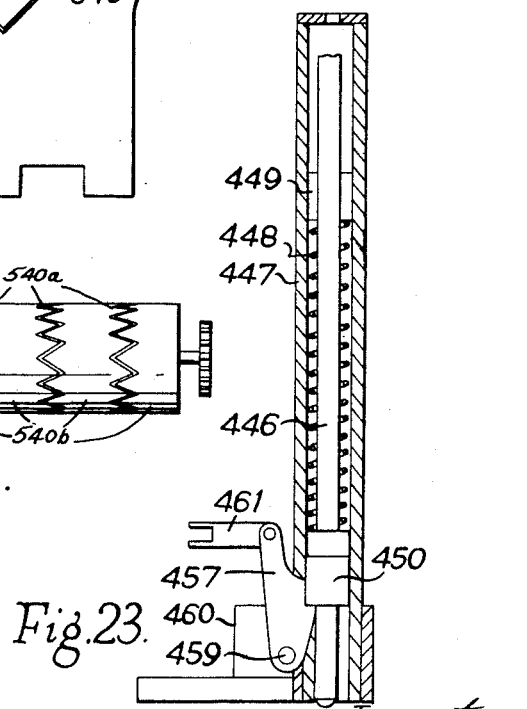
FIG. 23 shows a side view, taken in section, of the batch included in the paper cutting mechanism shown in FIGS. 18 and 19.

To cut the paper strip led in by the roller 431, a cutter blade 440 is attached to a rigid bar 441 secured to one plate of a hinge 442, the other plate of which is attached to another rigid bar 443. The bar 443 is carried on a pair of arm 444 secured to a shaft 445 carried by the side plates 413, 414. A cutter actuating rod 446 is contained in a housing 447 on the upper platform 415 and is biased downwardly by a compression spring 448 (see FIG. 23) extending between a fixed block 449 secured to the housing and a block 450 secured to the cutter actuating rod 446 and slidable within the housing. The upper end of the rod 446 is connected to one end of a cable 451 which has its other end connected to one end of a V-shaped pivot link 452. The link 452 is pivotally mounted on a pin 453 secured to the side plate 413 and carries at its other end a cam follower 454 which contacts a cam 455 keyed to the shaft 424. The cam 455 is shaped so that, on rotation of the shaft 424, the link 452 is pivoted about the pin 453 to tension the cable 451 so that the rod 446 is pulled upwards against the bias of compression spring 448. A catch 457 is pivotably secured by a pivot pin 459 to a bracket 460 attached to the actuating rod housing 447 and is pivotally connected to a link 461 which in turn is pivotally connected to one end of a further link 462. The link 462 is horizontally pivotable about a pivot 463 mounted on the upper platform 415 and is pivotally connected at its other end to the core (not shown) of a solenoid 464.

*Indexing Device*

On the end of the shaft 424 which projects through the side plate 414 (see FIG. 19), there is keyed a disc 465 which has a projecting pin 466 thereon. The pin 466 is arranged to actuate a micro-switch 467 mounted on a disc 468. The disc 468 is keyed to one end of a shaft 469 journalled in a U-shaped bracket 470 mounted on the lower platform 406, a manual control knob 471 being keyed to the other end of the shaft 469. A ball catch biased by a compression spring (not shown) is contained in a housing 472 mounted on one arm 473 of the bracket 470 and projects through the arm 473 to engage in recesses 474 provided on the disc 468. By this means, the control knob 471 can be rotated to set the micro-switch in any of a plurality of positions for varying the time during rotation of the shaft 424 at which the micro-switch is actuated by the pin 466. The micro-switch controls the solenoid 464 for effecting cutting movement of the cutter blade and also controls solenoids 476 the cores of which (not shown) are respectively connected to links 477. The links 477 are pivoted by pins 478 to brackets 479 fixed to the side plates 413 and 414 and are pivotally connected by pivot pins 481 to links 482 which are in turn pivotally connected by pins 483 to one end of links 484. The links 484 are respectively pivotally secured to the side plates 413 and 414 by pins 486 and, at their other ends, to a shaft 487 which extends between the side plates and carries a roller 489 which co-operates with the roller 431. The pins 483 are carried by a shaft (not shown) which extends through slots (not shown) in the side plates and has keyed thereon a circular rubber pad 490 (FIG. 18). The slots in the side plates are shaped to fit corresponding portions of the shaft carrying the pad 490 and to prevent rotation of this shaft. When the solenoids 476 are actuated by the micro-switch 467, the links 477 pivot in a counterclockwise direction as viewed in FIG. 18 to move the roller 489 away from the roller 431 and to press the paper strip between the circular rubber pad 490 and a rigid bar 492 mounted between the side plates, thus preventing the advance of the paper strip towards the cutter blade 431.

One of the solenoids 476 and the solenoid 464 are mounted on a bracket 494 fixed to the upper platform 415 and the other solenoid 476 is mounted on a similar bracket 495, also fixed to the upper platform.

*Exposure Device*

Having been severed by the cutter blade, the cut copy paper sheets are advanced by four flexible bands, an upper band 497 and a lower band 498 (see FIG. 20) being arranged to contact the upper and lower surfaces of the sheets adjacent their longitudinal edges. The bands 497 and 498, which may be of rubber or any other suitable material, are endless in form and are carried on guide wheels 500, 501, 502, 503, the wheels 500 and 501 being smaller than the wheels 502 and 503. Each flexible band also extends around a driving wheel 504, one of which is provided at each end of a pair of shafts 506, which are rotatably mounted in support brackets 507 secured to the uprights 408. A further driving wheel 508 is provided on each shaft 506 and is connected by a belt or chain 509 to a wheel 510 keyed to the shaft 418.

Between the lower wheels 502 and 503, there extends a suction box 511 having a perforated upper surface 512. The purpose of the suction box 511 is to hold the copy paper sheets flat during exposure. To deposite the paper sheets on the suction box 511 after they have been cut by the cutting device, the guide wheels are arranged to withdraw the flexible bands from the sheets. For this purpose, each guide wheel is rotatably secured to an arm 513 which is fixed to a shaft 514 (see FIG. 21), two guide wheels being thus mounted on each shaft 514. The shafts 514 are arranged parallel to each other in two parallel, superimposed plates between two parallel rectangular plates 515, in which they are journalled, and a slide member 516a is keyed to the end of each shaft 514. The slide members have slots engaging pins 517 provided on a pair of parallel rails 518 which are guided in guides 519 secured to the side plates. A block 519a is secured to both rails and has a pin 526 on which is rotatably carried a smaller block 520. The block 520 is slidably arranged in a corresponding recess 521 in an arm 522 keyed to a shaft 523. To the shaft 523 there is also keyed one end of a further arm 524 which carries at its other end a cam follower 525 engaging a cam 527 keyed to shaft 418. The cam 527 has over approximately half its periphery a recessed portion 528 and it will be understood that when the cam follower reaches this recessed portion, the arms 522 and 524 rotate clockwise as viewed in FIG. 18, causing the rails 518 to move longitudinally to the right and thereby causing the flexible bands to be pressed against the paper.

Each flexible band is tensioned by a pair of rollers 530 carried on a triangular plate 531 which is pivotable about a pin 532 secured to the respective rectangular plate 515 and is biassed by a tension spring 516 extending therefrom to the other triangular plate.

Referring to FIG. 20, it will be noted that the belt or chain 509, besides driving the wheels 508, also extends around wheels 534 and 535 and drives wheels 536 keyed to shafts 537, which are journalled in the rectangular plates and which carry rollers 538 co-operating with rollers 539 (which are also journalled in the rectangular plates) to advance the sheets through the developer powder supply device and the fusing device, which are described hereinafter.

*Powder Distributing Device*

Figure 22:
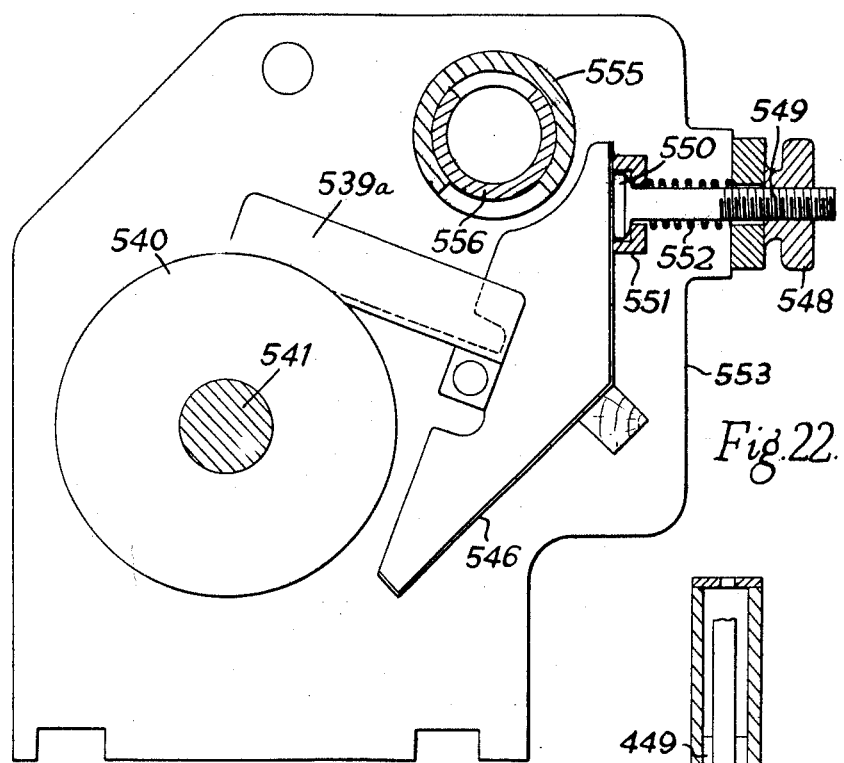
FIG. 22 shows a side view, taken in section, of the developer powder distributor mechanism included in the machine shown in FIG. 18.
Figure 24:
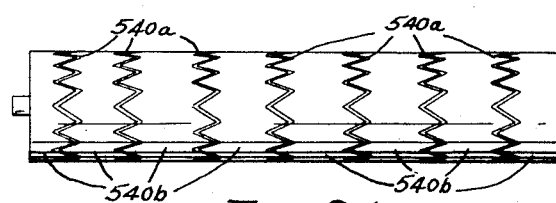
FIG. 24 shows a side view of the magnet roller included in the developer powder distributing mechanism shown in FIG. 22.

Referring to FIGS. 18, 22 and 24, a magnet roller 540 is provided on a shaft 541 which carries on one end a gear wheel 542 meshing with a further gear wheel 543. The gear wheel 543 is secured to a driving wheel 544 driven by a belt or chain (not shown) from wheel 545 keyed to shaft 418. On rotation, the magnet roller 540 attracts developer powder from a tray or container 546 to form "brushes" which on pressing against the sheet being advanced by the rollers 538 deposits toner thereon. The carrier particles are removed from the magnet roller by a scraper 539 (not shown in FIG. 18) and fall back into the tray 546.

The tray 546 can be adjusted towards or away from the magnet roller by means of a control knob 548 threaded on a spindle 549 having an enlarged end 550 in a retainer 551 fixed to the tray, a compression spring 552 extending between the retainer and a developer powder supply device housing 552.

For supplying powder to the tray 546, a pair of coaxial, longitudinally slotted tubes 555 and 556 extend through the housing 553, the outer tube 555 being fixed with its slot underneath and the inner tube 556 being rotatable.

The fusing device indicated generally by reference numeral 556 is similar to that shown in FIGS. 14 and 15 and will therefore not be described.

The invention thus provides in one compact machine the mechanism for effecting all the steps in the known electrophotographic reproduction process in a manner which is notably quick, clean and reliable and yet involves a minimum of supervision and which in particular avoids much of the wastage of copy paper incurred in using known machines.

We claim:

1. An electrophotographic copying machine comprising a housing containing copy material supply means for supplying light-sensitive copy material in strip form, cutter means for cutting said copy material strip into copy sheets, exposure means for producing images of an original on said copy sheets, developing means for developing said images on said copy sheets, and means for passing said copy sheets through said exposure means and said developing means and manually adjustable sheet length selector means extending from said housing and coupled to cutter means for conditioning said cutter means to cut sheets of selectively variable length from said strip.

2. An electrophotographic copying machine comprising a housing containing copy material supply means for supplying light-sensitive copy material in strip form, cutter means for cutting said copy material strip into copy sheets, exposure means for producing images of an original on said copy sheets, developing means for developing said images on said copy sheets, and means for passing said copy sheets through said exposure means and said developer means, a manually adjustable sheet length selector member on the exterior of said housing, and means coupling said sheet length selector member to said cutter means to condition said cutter means in accordance with the rotational adjustment of said sheet length selector means to cut sheets of selectively variable length.

References Cited in the file of this patent
UNITED STATES PATENTS

| | | |
|---|---|---|
| 1,745,985 | Denmire | Feb. 4, 1930 |
| 1,946,457 | Donnelley et al. | Feb. 6, 1934 |
| 2,031,503 | Rainey | Feb. 18, 1936 |
| 2,221,776 | Carlson | Nov. 19, 1940 |
| 2,674,308 | Knobel | Apr. 6, 1954 |
| 2,979,026 | Reuter | Apr. 11, 1961 |
| 3,002,434 | Reuter | Oct. 3, 1961 |